United States Patent
Zhao et al.

(10) Patent No.: US 8,539,518 B2
(45) Date of Patent: Sep. 17, 2013

(54) ELECTRONIC DEVICE HAVING LOCKING MECHANISM

(75) Inventors: Ting-Ting Zhao, Shenzhen (CN); Wei Liu, Shenzhen (CN); He-Li Wang, Shenzhen (CN); Bao-Gang Zhao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 76 days.

(21) Appl. No.: 13/217,142

(22) Filed: Aug. 24, 2011

(65) Prior Publication Data
US 2012/0182676 A1    Jul. 19, 2012

(30) Foreign Application Priority Data
Jan. 18, 2011    (CN) .......................... 2011 1 0020367

(51) Int. Cl.
  *G11B 17/03*    (2006.01)
(52) U.S. Cl.
  USPC .......................................... 720/647; 720/639
(58) Field of Classification Search
  USPC .......................................... 720/646, 647, 639
  See application file for complete search history.

(56) References Cited

U.S. PATENT DOCUMENTS

| | | | |
|---|---|---|---|
| 6,705,688 B2 * | 3/2004 | Tobishima | 312/223.1 |
| 6,802,069 B1 * | 10/2004 | Kojima | 720/613 |
| 7,134,128 B2 * | 11/2006 | Matsui et al. | 720/650 |
| 7,540,007 B2 * | 5/2009 | Morikawa et al. | 720/740 |
| 7,958,520 B2 * | 6/2011 | Jitsukawa et al. | 720/623 |
| 8,185,920 B2 * | 5/2012 | Wang et al. | 720/646 |
| 2003/0043720 A1 * | 3/2003 | Fujisawa | 369/75.2 |
| 2006/0198095 A1 * | 9/2006 | Lee | 361/685 |
| 2012/0182676 A1 * | 7/2012 | Zhao et al. | 361/679.01 |

* cited by examiner

*Primary Examiner* — Brian Miller
(74) *Attorney, Agent, or Firm* — Altis Law Group, Inc.

(57) ABSTRACT

An electronic device includes a body, a disc lid rotatably mounted to the body and including two hooks, and a locking mechanism secured to the body and for locking the disc lid to and unlocking the disc lid from the body. The locking mechanism includes a sliding bar slidable relative to the body, and at least one resisting member secured to the body. The sliding bar is slidable between a locking position for locking the disc lid and an unlocking position for unlocking the disc lid. The sliding bar defines at least one sliding slot, and includes two latching members for respectively hooking the hooks when in the locked position and releasing the hooks when in the unlocked position. The at least one resisting member is slidably received in the sliding slot, and resists the sliding bar against the body to prevent the sliding bar from deforming.

5 Claims, 6 Drawing Sheets

ELECTRONIC DEVICE HAVING LOCKING MECHANISM

BACKGROUND

1. Technical Field

The present disclosure relates to electronic devices; and particularly to an electronic device having a locking mechanism for releasing or locking a cover of the electronic device.

2. Description of Related Art

Referring to FIGS. 5 and 6, an electronic device, such as a DVD player, includes a body 201, a display 301 rotatably coupled to the body 201, a disc lid 40 rotatably mounted to the body 201, and a locking mechanism 501 for locking and releasing the disc lid 40 from the body 201. The locking mechanism 501 typically includes a sliding bar 502 slidably coupled to the body 201, and an operating member 503 for driving the sliding bar 502 to slide from a locking position, for locking the disc lid 40, to an unlocked position for releasing the disc lid 40. The sliding bar 502 has one or more latching members (not labeled) for hooking the corresponding hooks (not shown) protruding from the disc lid 40 to lock the disc lid 40 when in the locked position, and for disengaging the corresponding hooks to release the disc lid 40 when in the unlocked position. However, the sliding bar 502 is elongated shaped, and there is no supporting apparatus to support the sliding bar 502, thus the sliding bar 502 is easily deformed when being driven to slide by the operating member 503, and the disc lid 40 cannot be opened because of the deformed sliding bar 502.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout four views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
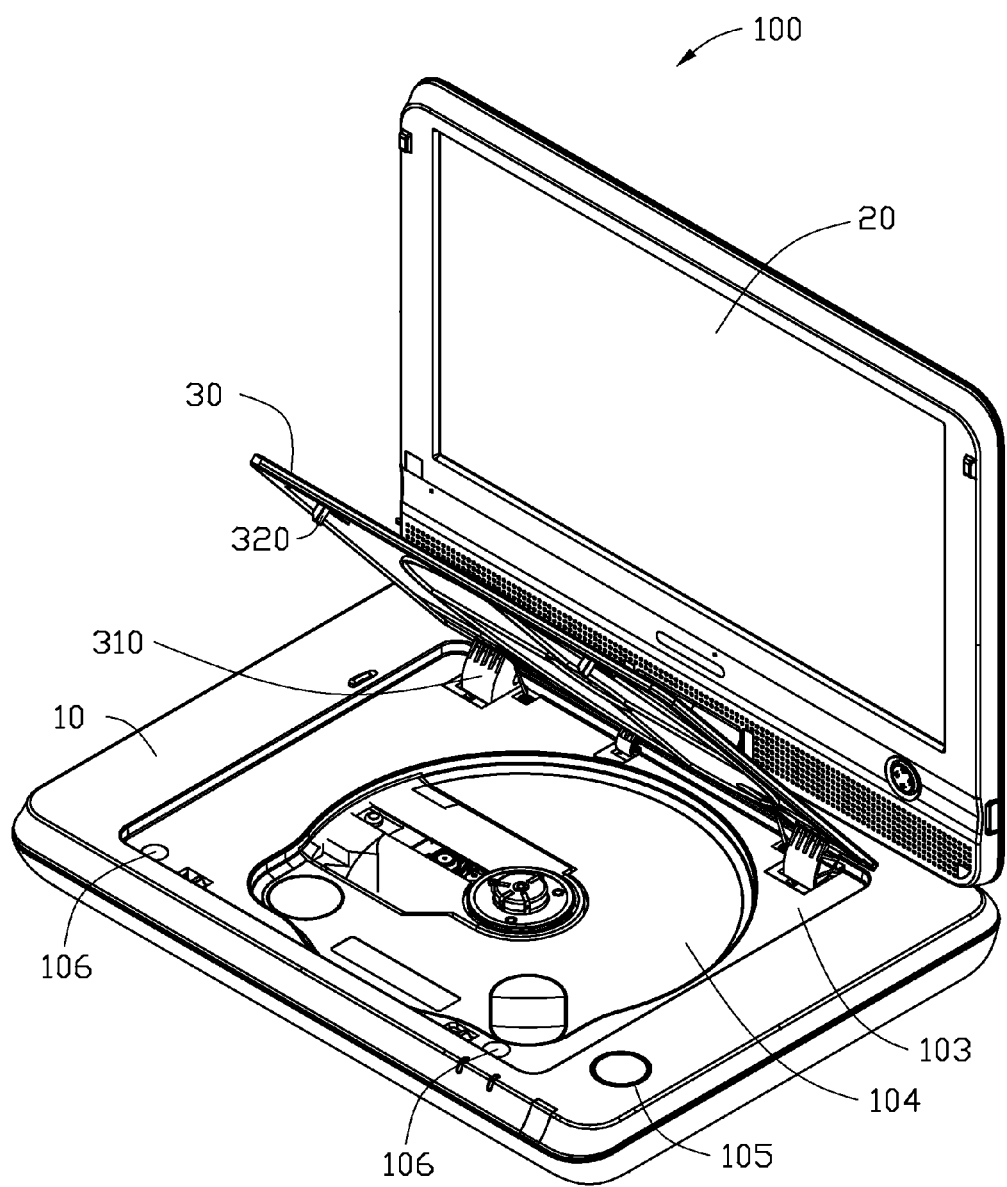
FIG. 1 is a perspective view of an electronic device in accordance with an exemplary embodiment.

Referring to FIG. 1, a perspective view of an electronic device 100 in accordance with an embodiment is shown. In the embodiment, the electronic device 100 may be a portable disc player. The electronic device 100 includes a body 10, a display 20 rotatably coupled to the body 10, a disc lid 30 rotatably mounted to the body 10, and a locking mechanism 40 for locking the disc lid 30 to and unlocking the disc lid 30 from the body 10.

Figure 2:
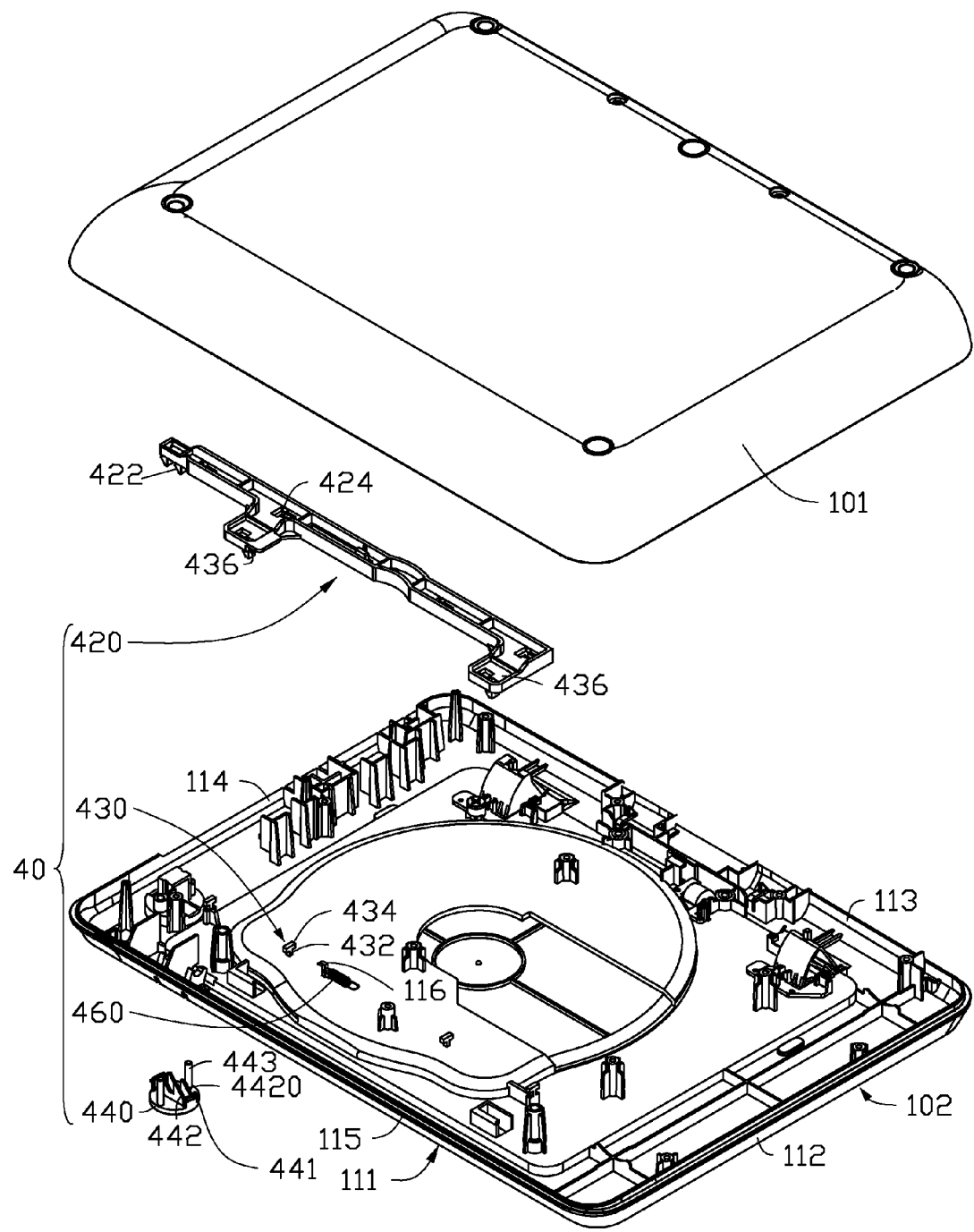
FIG. 2 is a partially disassembled perspective view of the electronic device of FIG. 1.

Referring also to FIG. 2, the body 10 includes a bottom case 101 and a top case 102 engaging with the bottom 101. The bottom case 101 and the top case 102 cooperatively define a space (not labeled) for accommodating components, such as a motherboard, a processor, a disc drive, and other components (not shown) for the functionality of the electronic device 100. The top case 102 further includes a top plate 111 and four sidewalls (hereinafter, a first sidewall 112, a second sidewall 113, a third sidewall 114 opposite to the first sidewall 112, and a fourth sidewall 115 opposite to the second sidewall 113) protruding from rims of the top plate 111. The top plate 111 recesses to define a receiving space 103 for receiving the disc lid 30. The bottom of the receiving space 103 further recess to define a receiving portion 104 for receiving a disc (not shown). An end of the bottom of the receiving space 103 adjacent to the fourth sidewall 115 defines two apertures 106 communicating with the receiving space of the body 10. The top plate 111 further defines a recess 105. The recess 105 is arranged adjacent to the first and fourth sidewalls 112, 115. The bottom of the recess 105 defines an opening 107 (see FIG. 3) for communicating the recess 105 with the space of the body 10. Two limiting posts 108 project from an inner surface of the top plate 111. The limiting posts 108 are arranged at opposite sides of the opening 107. Each limiting post 108 defines a limiting hole 109 extending through the bottom of the recess 105. A first post 116 projects from an inner surface of the top plate 111.

The disc lid 30 is substantially rectangular, and is rotatably mounted to the body 10 by two hinge mechanisms 310. The disc lid 30 acts as an entrance for allowing discs (not shown) to be loaded to and unloaded from the receiving portion 104 when the disc lid 30 is open. Two hooks 320 project from an end of the disc lid 30 opposite to the hinge mechanisms 310 and respectively correspond to the apertures 106. The hooks 320 extend through the corresponding apertures 106 when the disc lid 30 is received in the receiving space 103, and are capable of being hooked by the locking mechanism 40 to lock the disc lid 30 to the body 10 and being released by the locking mechanism 40 to allow the disc lid 30 to be unlocked from the body 10.

The locking mechanism 40 is received in the body 10, and locks and releases the disc lid 30. The locking mechanism 40 includes a sliding bar 420, three resisting members 430 for slidably securing the sliding bar 420 to the top case 102, an operating member 440, and an elastic element 460.

The sliding bar 420 is substantially elongated shaped, and is slidably mounted to the top case 102 by the resisting members 430. The sliding bar 420 is arranged parallel to the fourth sidewall 115, and is capable of sliding longitudinally between a locked position for locking the disc lid 30 and an unlocked position for releasing the disc lid 30. A plurality of protruding blocks 421 projects from an end of the sliding bar 420. Each protruding block 421 defines a first inclined surface 422. Three sliding slots 424 are spaced and defined in the sliding bar 420, and respectively correspond to the resisting member 430. Each sliding slot 424 is T-shaped, and includes a guiding portion 426 extending in a direction parallel to the extending direction of the sliding bar 420 and a fixing portion 428 extending in a direction perpendicular to the guiding portion 426. Two latching portions 436 project from a side of the sliding bar 420, and respectively correspond to the hooks 320 of the disc lid 30. The latching portions 436 hook the corresponding hooks 320 to lock the disc lid 30, and release the corresponding hooks 320 to unlock the disc lid 30.

Furthermore, the middle of the sliding bar 420 defines an elongated slot 427 extending longitudinally. The elongated slot 427 corresponds to and receives the post 116 to allow the first post 116 to slide. A second post 429 (see FIG. 3) projects from the sliding bar 420. The second post 429 is arranged adjacent to an end of the elongated slot 427.

Each resisting member 430 is substantially T-shaped, and includes a sliding portion 432 and a supporting portion 434 perpendicular to the sliding portion 432. The sliding portion 432 is secured to an inner surface of the top plate 111. The supporting portion 434 is secured to an end of the sliding portion 342 away from the sliding portion 342. The supporting portion 434 can be inserted into the fixing portion 428 of the corresponding sliding slot 424, and the sliding portion 432 is slidable along the guiding portion 426 of the corresponding sliding slot 424. The width of the guiding portion 426 is less than the length of the supporting portion 434, but is slightly larger than the width of the sliding portion 432.

The elastic element 460 is a spiral spring in the embodiment, and provides an elastic force for driving the sliding bar 420 to slide from the unlocking portion to the locked position. Opposite ends of the elastic element 460 are respectively secured to the first post 116 and the second post 429.

The operating member 440 is received in the recess 105, and includes an actuating portion 441, a plurality of resisting portions 442, and two cylindrical columns 443. The actuating portion 441 is disc-shaped, and can be received in the recess 105 for being used as a pressing surface to actuate the locking mechanism 40. The resisting portions 442 projects from a central area of the actuating portion 441 and respectively corresponds to the protruding blocks 421. Each resisting portion 442 defines a second inclined surface 4420 engaged with the first inclined surface 422. The two cylindrical columns 443 are respectively arranged at opposite sides of the resisting portions 442, and can be respectively inserted into the limiting hole 109 to prevent the operating member 40 from rotating inside the recess 105.

Figure 3:
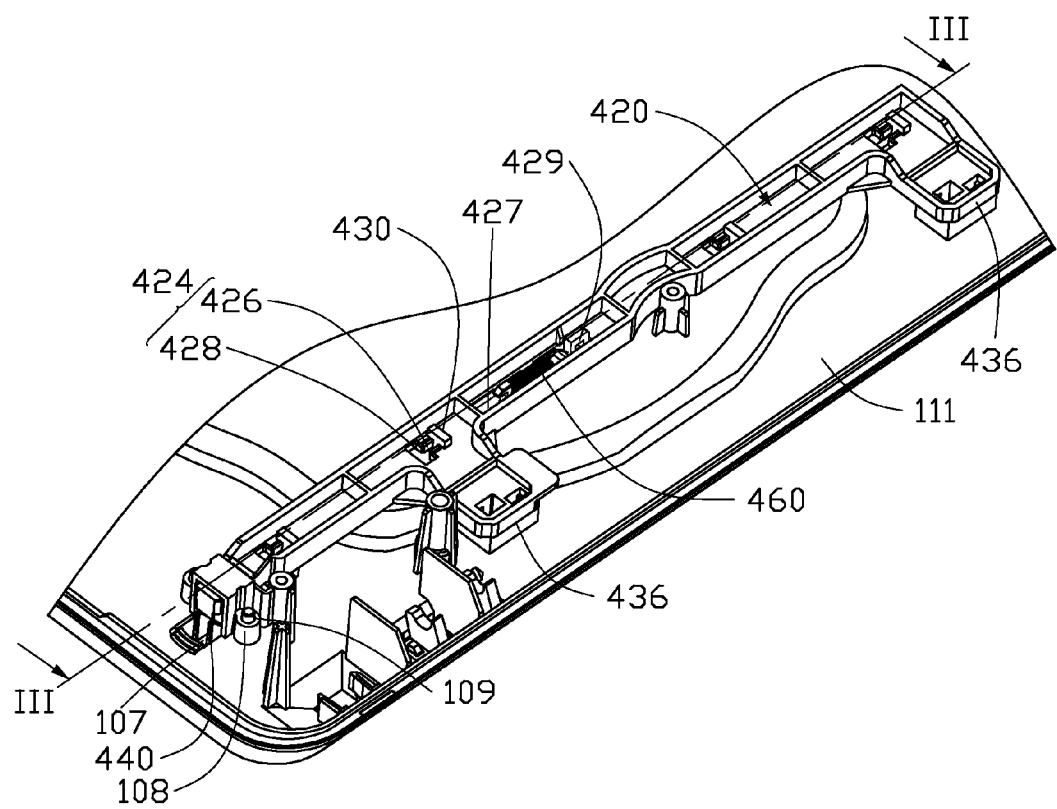
FIG. 3 is a partially assembled perspective view showing the locking mechanism mounted to the body in FIG. 2.
Figure 4:
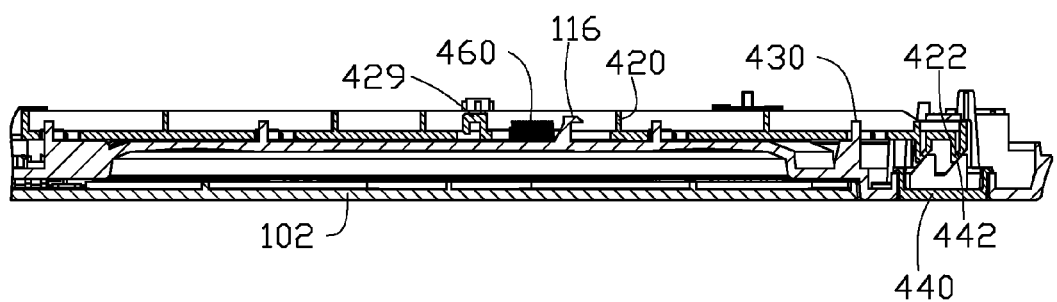
FIG. 4 is a cross-sectional view taken line along IV-IV of FIG. 3.
Figure 5:
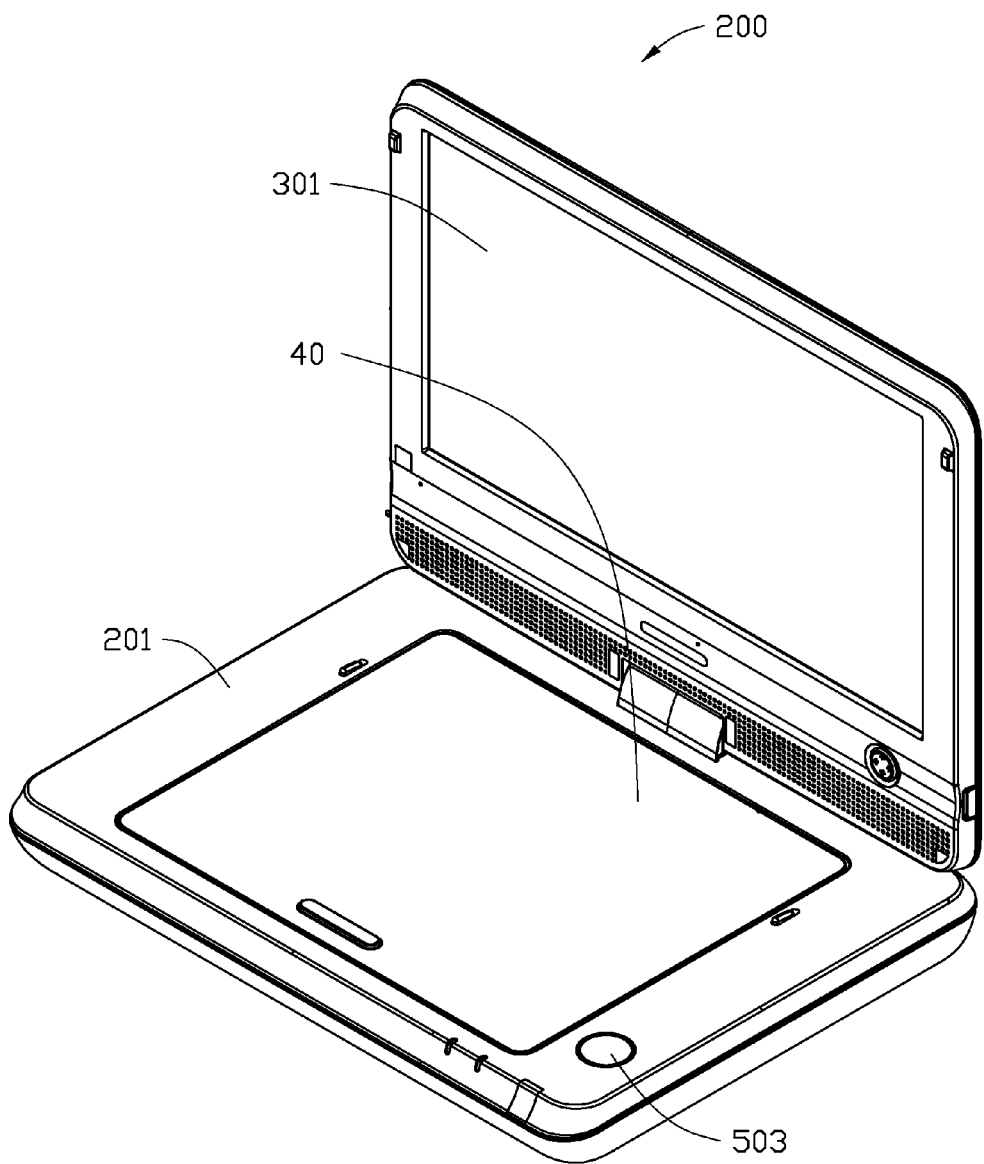
FIG. 5 illustrates a perspective view of a prior art electronic device having a locking mechanism.
Figure 6:
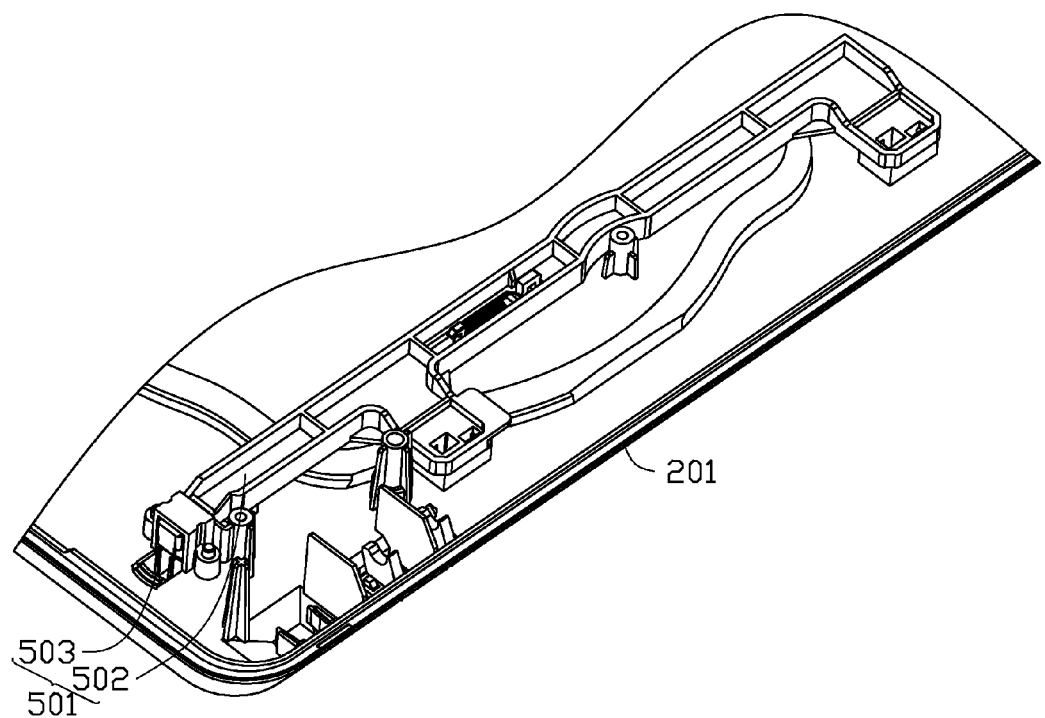
FIG. 6 is a partially assembled perspective view showing the locking mechanism of the prior art electronic device of FIG. 5.

Referring to FIGS. 3 and 4, in assembly, first, the guiding portions 432 extend through the corresponding guiding portions 428 and are further secured to the inner surface of the top plate 111, and the supporting portions 434 cooperate with the sliding portions 432 to resist the sliding bar 420 against the inner surface of the top plate 111. As a result, the sliding bar 420 is slidably secured to the top plate 111, and the first post 116 extends through the elongated hole 427 at the same time. Second, opposite ends of the elastic element 460 are respectively secured to the first post 116 and the second post 429. Third, the actuating portion 441 is received in the recess 105, the resisting portion 442 extends through the opening 107 with the second inclined surface 4420 engaging with the first inclined surface 422 of the protruding blocks 421, and the cylindrical columns 443 are respectively received in the limiting holes 109. Finally, the top case 102 is secured to the bottom case 101 by a plurality of fixing members, such as blots and screws (not shown).

After assembly, because the width of the guiding portion 426 is less than the length of the supporting portion 434, and the width of the sliding portion 432 is slightly less than the width of the guiding portion 426. The sliding portion 432 engages with the guiding portion 426 to allow the sliding bar 420 to move longitudinally, and the supporting portion 434 resists the sliding bar 420 against the inner surface of the top plate 111 to prevent the sliding bar 420 from deforming in a direction parallel to the top plate 111. As a result, with assistance of the resisting members 430, when the operating member 440 is pressed to drive the sliding bar 420 to slide, the deformation of the sliding bar 420 is avoided.

When the disc lid 30 is opened and the operating member 440 is released, the locking mechanism 40 is in an original state. At this time, the elastic element 460 is in a relaxed state, and the sliding bar 420 is driven to the locked position. To lock the disc lid 30 to the body 10: the disc lid 30 is rotated to be received in the receiving space 104, and the hooks 320 respectively extend through the apertures 106 and are respectively hooked by the latching members 436. Thus, the disc lid 30 is locked to the body 10.

To unlock the disc lid 30: the operating member 440 is pressed downward, the sliding bar 420 is driven to slide to the unlocked position by the first inclined surface 422 engaging with the second inclined surface 4420, and the elastic element 460 is elongated to be elastically deformed. As a result, the disc lid 30 is released. After the operating member 440 is released, the deformed elastic element 460 provides a restoring force to drive the sliding bar 420 to return to the locking position.

Even though information and the advantages of the present embodiments have been set forth in the foregoing description, together with details of the structures and functions of the present embodiments, the disclosure is illustrative only; and changes may be made in detail, especially in matters of the shape, size, and arrangement of parts within the principles of the present embodiments to the full extent indicated by the broad general meaning of the terms in which the appended claims are expressed.

What is claimed is:

1. An electronic device, comprising:
a body;
a disc lid rotatably mounted to the body, the disc lid comprising at least one hook; and
a locking mechanism secured to the body and for locking the disc lid to and unlocking the disc lid from the body, wherein the locking mechanism comprises a sliding bar slidable relative to the body in a longitudinal direction (a first direction) and at least one resisting member secured to the body; the sliding bar is capable of sliding between a locking position for locking the disc lid and an unlocking position for unlocking the disc lid, the sliding bar defining at least one sliding slot, and comprises at least one latching member for hooking the at least one hook when being in the locking position and releasing the at least one hook when being in the unlocking position, the at least one resisting member is slidably received in the at least one sliding slot, and resists the sliding bar against the body to prevent the sliding bar deforming in a second direction perpendicular to the first direction;
wherein at least one protruding block projects from an end of the sliding bar, the at least one protruding block defines a first inclined surface.

2. The electronic device of claim 1, wherein the locking mechanism comprises an operating member for driving the sliding bar to slide from the locking position to the unlocking position.

3. The electronic device of claim 2, wherein the operating member comprises at least one resisting portion, the at least one resisting portion defines a second inclined surface engaging with the first inclined surface.

4. The electronic device of claim 3, wherein the operating member further comprises at least one limiting post for preventing the operating member from rotating.

5. The electronic device of claim 4, wherein the body defines a recess for receiving the operating member, the bottom of the recess defines an opening for allowing the at least one resisting portion extending through, and at least one limiting hole for receiving the at least one limiting post.

* * * * *